Oct. 27, 1964   W. T. RENTSCHLER   3,153,997
PHOTOGRAPHIC INTRA-LENS SHUTTER
Filed July 17, 1962   2 Sheets-Sheet 2
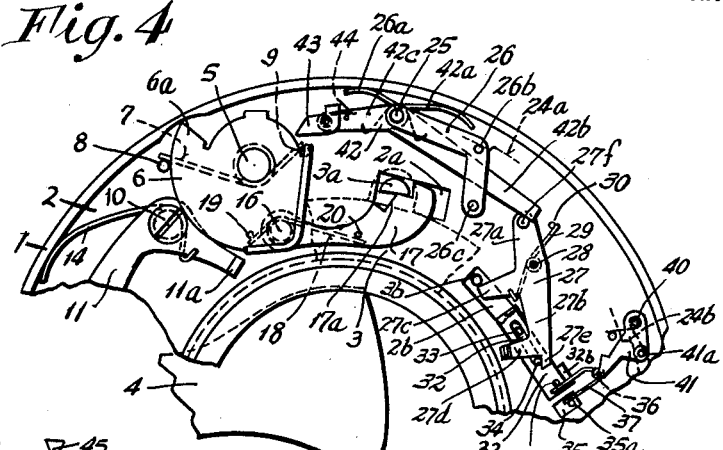
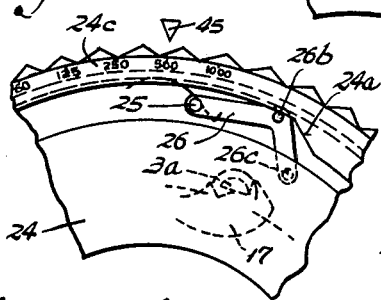
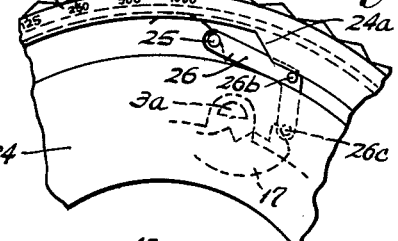
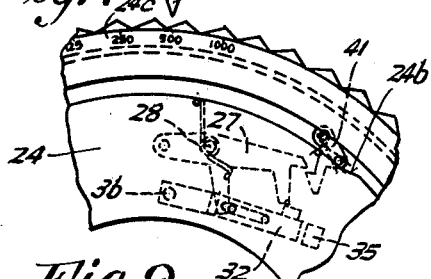
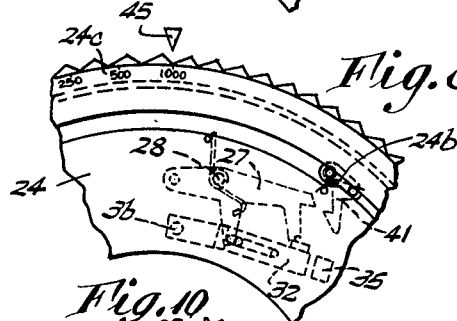
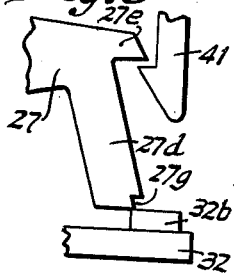
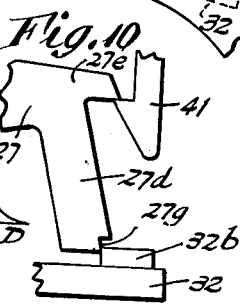
INVENTOR.
Waldemar T. Rentschler
BY
Arthur A. March
ATTORNEY 3,153,997
PHOTOGRAPHIC INTRA-LENS SHUTTER
Waldemar T. Rentschler, Calmbach (Enz), Germany, assignor to Alfred Gauthier, G.m.b.H., Calmbach (Enz), Germany, a corporation of Germany
Filed July 17, 1962, Ser. No. 210,526
Claims priority, application Germany, July 19, 1961
7 Claims. (Cl. 95—63)

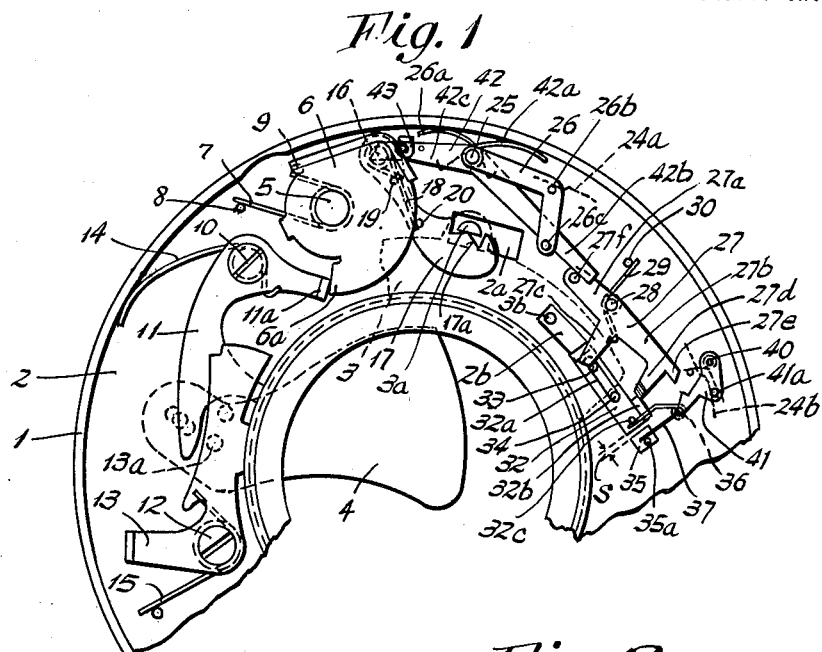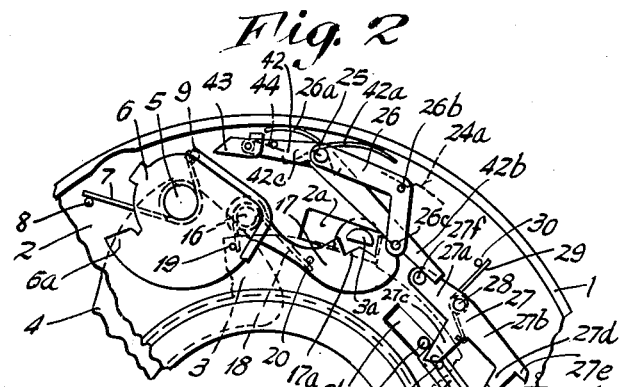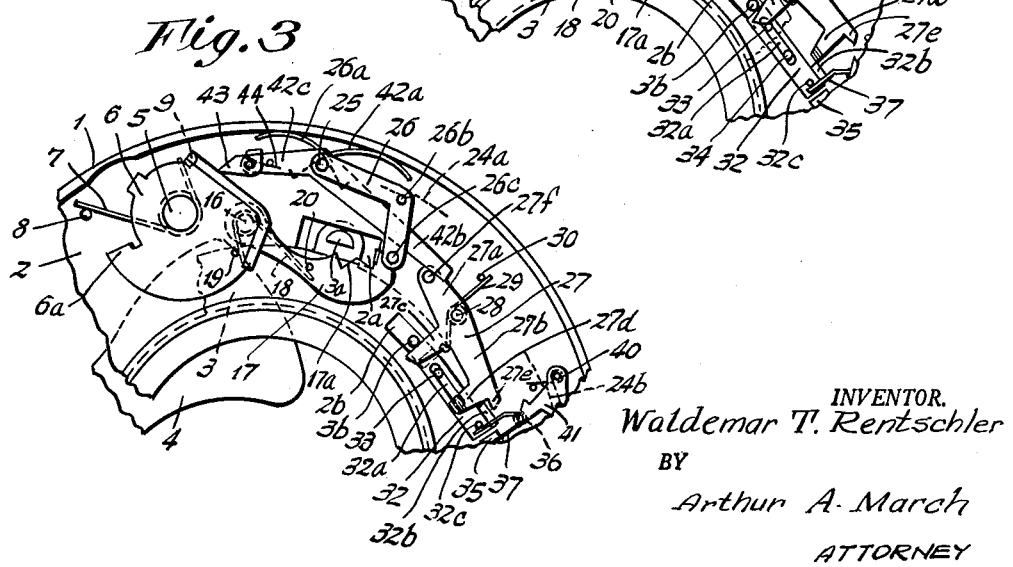

This invention relates to a photographic intra-lens shutter having reciprocating shutter blades wherein the means for actuating the shutter blades is connected to the shutter driving member by a driving pawl.

The object of the present invention is to provide an intra-lens shutter in which the exposure time may be of shorter duration than any heretofore obtainable by similar shutter constructions and without in any way increasing the normal maximum cocking moment of the setting member.

The object is attained by the provision of means operatively connected with the driving pawl which can be so positioned and so arranged as to activate and accomplish a shorter exposure time without in any way changing the normal activation of the shutter blades or the members driving said blades.

According to the present invention, in the embodiment hereinafter disclosed, the means for accomplishing the desired result is in the form of a deflecting member which is positioned intermediate the driving pawl and the means for operating the shutter and which is so constructed as to permit the shutter blades to open to the fullest extent while causing the shutter blades to return to closed position in a shorter period of time than that heretofore accomplished by similar shutters. For example, a shutter having a shortest exposure time of approximately 1/500 of a second may with the use of the present invention obtain an exposure time of 1/1000 of a second without any necessity for changing the basic structure of the mechanism for operating the shutter or the shutter itself.

Therefore, a feature of the present invention is the ability to utilize shutter construction of the well known type without change, and by the provision of a separate, inexpensive, easily constructed device to obtain exposure times of much shorter duration than were heretofore possible with the use of known shutter operating structures.

Another feature of the present invention is the provision of means which operate to close the shutter in a relatively short period of time only after the shutter blades have been fully opened for the proper exposure. In addition, the time during which the shutter blades return to closed position is reduced to a minimum.

Still another feature of the present invention is the provision of means for reducing the exposure time which may be rendered operative at the same time and with the same movement as that necessary for cocking the driving means for the shutter. With this construction, the operation for cocking the shutter is extremely simple and there is no necessity for more than one movement for both cocking the shutter and attaining the shorter exposure time.

According to the present invention, the means for obtaining the shorter exposure time do not in any way interfere with the ability of the camera to be used with longer exposure time. For example, in the illustrative embodiment of the present invention hereinafter described, the means provided by the invention for obtaining exposure times of 1/1000 of a second do not interfere with or in any way restrict the operation of the structural members which accomplish exposure times of 1/500 of a second, or of longer duration.

The invention is hereinafter described in greater detail pointing out the structure which accomplishes the objects, advantages, and features in the following specification and drawings which disclose one illustrative embodiment of the invention.

In the drawings:

FIG. 1 is a fragmentary front view partly in elevation and partly in vertical section on an enlarged scale of a photographic intra-lens shutter structure with the cover plate removed. Arranged in the shutter housing, the shutter is in cocked position and is set for the shortest exposure time with the deflecting and driving members of the present invention in operative position. Only those elements which are essential for an understanding of the invention are shown.

FIG. 2 is a view like FIG. 1, but illustrating the position of the parts after the release of the shutter drive member has been affected and just prior to the return movement of the shutter driving member.

FIG. 3 is a view like FIG. 1, but illustrating the position of the parts when the shutter driving member is returning to its original position under the influence of the deflecting and driving members provided by the present invention.

FIG. 4 is a view like FIG. 1, but illustrating the positions of the parts when the shutter driving mechanism has completely run down.

FIG. 5 is a fragmentary front view partly in elevation and partly in vertical section illustrating the position of the deflecting and driving members of the present invention with the shutter speed set at 1/500 of a second.

FIG. 6 is a view like FIG. 5, with the shutter speed set at 1/1000 of a second.

FIG. 7 is a view like FIG. 5, with the shutter speed set at 1/500 of a second, and showing the setting position of the pawl acting on the driving device of the present invention in relation to the driving pawl.

FIG. 8 is a view like FIG. 7, but showing the setting position of the pawl with the shutter speed being set at 1/1000 of a second.

FIG. 9 is a fragmentary view of the driving member of the present invention and the locking slide supporting the said driving member.

FIG. 10 is a view like FIG. 9, but illustrating the driving member in the position where it is engaged and locked by the pawl.

FIG. 11 is a digaram representing the time during which the shutter opens, remains open, and closes, without the utilization of the structure provided by the present invention, and with the utilization of the structure provided with the present invention.

Referring specifically to the drawings, there is shown a shutter housing 1 provided with a base plate 2, in the usual fashion. An actuating member illustrated in the form of a driving ring 3 for reciprocally moving the shutter blades 4 (only one of which is shown for clarification purposes) is rotatably disposed on the base plate 2 and co-axially of the lens axis of the shutter housing. A shaft 5 is rotatably disposed in the shutter housing. A driving member, constructed in the usual fashion in the form of a disk 6, is located at one end of the shaft 5. The other end of the shaft 5 projects from the shutter housing 1 and, for cocking the shutter, is operatively connected in a well known manner to an actuating device (not shown) as, for example, the film transport device of the camera. The driving member or disk 6 is influenced to rotate in a clockwise direction under the influence of a coil spring 7 which is disposed about the shaft 5. One end of the coil spring 7 is supported by a fixed pin 8 disposed in the housing 1 and the other end of the spring 7 is supported by a pin 9 disposed on the driving member or disk 6. The driving member 6 is provided with a projection 6a which is adapted to engage an arresting lever 11 rotatably positioned about axis 10. As shown in FIG. 1, this engagement is accomplished between the bent-off lug 11a provided at one end of the arresting lever 11 and the projection 6a on the driving disk. The other end of the arresting lever is disposed in the path of movement of a releasing lever 13 rotatably positioned about fixed axis 12. A spring 14 disposed about axis 10 influences the arresting lever 11 for movement in a counter-clockwise direction. A spring 15 disposed about axis 12 of the releasing lever 13 influences the releasing lever for rotation in clockwise direction. A pin 13a disposed on lever 13 establishes the operative connection between the releasing lever 13 and the arresting lever 11. When the releasing lever rotates about its axis 12, the pin 13 engages the arresting lever 11, moving the said lever against the action of the spring 14.

A driving pawl 17 is pivotally disposed on an articulated pin 16 of the driving member 6. The free end of the driving pawl is provided in the usual fashion with coupling jaws 17a which engages pin 3a disposed on the driving ring 3. The pin 3a extends through an aperture 2a on the base plate 2.

To maintain the driving pawl 17 in operative engagement with the pin 3a, a coil spring 18 is provided and is disposed about the articulated pin 16. One end of the coil spring engages pin 19 and the driving member 6 and the other end of the spring 18 engages pin 20 on the driving pawl to influence the driving pawl for movement in a counterclockwise direction.

In addition to the above described shutter mechanism which is oftentimes found in intra-lens shutter arrangements provided with reciprocating shutter blades, the present invention provides a novel and unique structure for obtaining a shorter exposure time than heretofore obtainable. This is accomplished without changing the normal shutter driving mechanisms as hereinabove set forth. For example, in the event the shutter mechanism described above enables the attainment of an exposure time of 1/500 of a second, the same mechanism may be utilized to accomplish the same result. However, according to the present invention, a supplementary device is provided which enables the attainment of an exposure time, for example, of 1/1000 of a second.

In accordance with the present invention, this feature is attained by the provision of another driving device which can be connected to or disconnected from the hereinbefore described shutter driving mechanism, at the option of the user of the camera. In the form shown for illustrative purposes, the driving device of the present invention comprises a deflecting member 26 which is pivotally positioned about fixed axis 25. The deflecting member, as illustrated, is movable in response to the movement of the exposure time setting member 24 as illustrated particularly in FIGS. 5 through 8. The exposure time seting member is provided with a setting cam 24a, a control cam 24b, and a setting scale 24c for the purposes hereinafter set forth. The driving device provided by the present invention also comprises a driving lever 27 rotatably disposed on fixed axis 28 located on the base plate 2.

Referring to specific exemplified details, the deflecting member 26 is influenced for movement by coil spring 26a and the said deflecting member is constructed, for illustrative purposes, in the form a one-armed angle lever. The operative engagement of the deflecting member or angle lever 26 with the exposure time setting member 24 is accomplished by means of a pin 26b and pin 26c, which latter pin is adapted to be moved into the path of movement of driving pawl 17 in the fashion hereinafter described.

The driving means of the driving device of the present invention, as illustrated, comprises a lever provided with three arms 27a, 27b and 27c. The arms 27a and 27b extend in a straight line above the depending arm 27c which latter extends in a direction radial to the lens axis.

The driving lever 27 is influenced for movement by a coil spring 29 disposed about axis 28 of the driving lever 27. One end of the coil spring 29 engages the fixed pin 30, while the other end of the coil spring engages the arm 27c of the driving lever 27 influencing the driving lever for movement in a clockwise direction about axis 28. The arm 27c of the driving lever 27 is disposed in the path of movement of the pin 3b on driving ring 3 for the purpose hereinafter set forth. The pin 3b projects through an opening 2b in the base plate 2.

A locking lever 32 constructed in the form of an arresting slide is also disposed in the path of movement of the pin 3b. The arresting slide 32 is provided with a slot 32a which accommodates two fixed pins 33 and 34. The arresting slide is longitudinally movable in either direction with said movement being limited by the engagement of the ends of the slot with either fixed pin 33 or 34 depending upon the direction in which the slide moves. A projection 32b is provided at one end of the arresting slide and supports the bent-off lug 27d provided on the arm 27b of the driving lever 27. The free end of the bent-off lug 27d is so constructed that it may be retained in starting position, while, nevertheless, being able to slide past the stop 32 during rotary movement of the driving lever 27 about axis 28.

As further shown in the drawings, a fixed stop 35 is affixed to the base plate 2 in any suitable fashion, for example, by means of screws or the like. The stop 35 carries a pin 35a which is engaged by one end of a coil spring 37. The coil spring is held in position about fixed pin 36 with the other end of the coil spring abutting fixed pin 32c provided on the arresting slide 32. To maintain the additional driving device hereinabove described in inoperative position during the normal exposure time of the intra-lens shutter provided by the usual shutter drive mechanism hereinbefore described, a pawl 41 is pivotally disposed about fixed pin 40 carried by the shutter base plate 2. For the purposes hereinafter set forth, the pawl is adapted to operatively engage a lug 27e located on the driving lever 27. A pin 41a disposed on the pawl 41 engages the cam 24b of the exposure time setting member 24.

In the illustrated embodiment of the invention, a two-armed cocking lever 42 is rotatably disposed about fixed axis 25 adjacent to the deflecting member 26. The two-armed cocking lever 42 is adapted to guide the driving lever 27 of the additional driving device provided by the present invention into cocked position. The two-armed cocking lever 42 is influenced for movement in a clockwise direction by spring 42a. One arm 42b of the cocking lever 42 engages pin 27f disposed on lever 27. The other arm 42c of the two-armed cocking lever 42 is so constructed with relation to pin 9 provided on driving member 6 that the pin 9 is able to bypass lever 42 when the driving member 6 rotates in a clockwise direction, while the pin 9 will engage the cocking lever 42 when the driving member 6 rotates in a counterclockwise direction. By means of this latter engagement, the movement of the driving member 6 is transmitted to cocking lever 42 rotating the same about its axis 25. To accomplish the aforesaid result an overriding pawl 43 is articulately disposed at one extremity of the lever arm 42c, said pawl being maintained normally in out-stretched straight position extending from the lever arm 42c by means of a spring 44.

Referring particularly to the disclosure of the present invention illustrated in FIGS. 5 through 8, the exposure time setting member, adapted to cooperate with the deflecting member 26 of the additional driving device, is provided with an exposure time setting scale 24c associated with a fixed mark 45 on the camera housing. As heretofore set forth, the exposure time setting member 24 comprises a setting cam 24a which causes the deflecting member to pivot clockwise or radially inwardly when the exposure time is set for a shorter duration than 1/500 of a second, as shown in FIG. 6. As a result of this pivoting movement, the pin 26c carried by the deflecting member 26 moves into the path of movement of the driving pawl 17. The exposure time setting member is also provided with another cam 24b for controlling the pawl 41. The cam 24b is constructed similarly to the cam 24a, viz. in such fashion that the pawl 41 engaging said cam is moved away from the range of pivotal movement of the driving lever 27, when the exposure time setting of the camera is for a value of less than 1/500 of a second. On the other hand, the pawl 41 engages the driving lever 27 at all times when the exposure setting is for a longer time value than 1/500 of a second thereby to render the driving lever inoperative under such conditions during the running down of the exposure.

The method of operation and the functioning of the respective parts of the shutter driving mechanism is as follows:

When the shutter is set at the exposure time of, for example, 1/500 of a second, the parts of the shutter arrangement occupy the positions illustrated in FIGS. 5 and 7. In this position, the deflecting member 26 is out of the path of movement of the driving pawl 17, while the locking pawl 41 engages the driving lever 27. When the release lever 13 is actuated, the driving member 6 rotates under the influence of driving spring 7 to reciprocally move the shutter blades 4 into open and closed position in a well known manner by means of the movement of the driving pawl 17 and the subsequent motion transmitted to the shutter blade actuating member 3. During this operation, the driving pawl 17 continues to remain in operative engagement with the pin 3a on the shutter blade actuating member 3 and this engagement continues during the entire movement of the shutter drive mechanism.

As illustrated in FIG. 11 under the foregoing conditions, the time sequence of the shutter operation is as follows: the ascending curve A–B indicates the time during which the shutter opens; the horizontal line B–C indicates the time in which the shutter remains open; and the descending curve C–D shows the time during which the shutter closes. This diagram illustrates the operation of the shutter under a setting for an exposure time of 1/500 of a second. When an exposure time of longer duration than 1/500 of a second is desired the setting member 24 is accordingly adjusted. Under such conditions the periods of time involved in the opening and closing operations of the shutter remain the same. However, the period during which the shutter remains open is of longer duration than that shown by the horizontal line B–C as a result of the operation of a well known escapement mechanism (not shown in the drawings).

According to the present invention, means are provided for obtaining an exposure time of shorter duration than 1/500 of a second which nevertheless uses the aforesaid well known shutter arrangement. To obtain this result, the exposure time setting member is moved to the left from the position illustrated in the drawings in FIGS. 5 and 7, to the position illustrated in FIGS. 6 and 8 wherein the scale value 1,000 of the exposure time setting scale 24c is disposed opposite the fixed mark 45. In this position, the deflecting member 26 has pivoted into the path of movement of the driving pawl 17. This pivoting movement is caused by the engagement of the deflecting member 26 with the cam 24a on the exposure time setting member 24. In addition, pawl 41 on the driving lever 27 of the additional driving device is disengaged from the driving lever 27. The disengagement is caused by the movement of the pawl 41 against the cam 24b on the exposure time setting member 24. The ensuing position is illustrated in FIGS. 1 through 4, and FIG. 8.

When the exposure time is set at 1/1000 of a second, upon the actuation of the release lever 13 from the cocked position shown in FIG. 1, the driving pawl 17 moves to the right as a result of the movement of the driving member 6 and the simultaneous consequent movement of the pin 3a disposed on the shutter blade actuating member 3.

During this operation, the driving pawl 17 continues its operative engagement with pin 3a until such time as the free end of the driving pawl strikes the deflecting pin 26c disposed on the deflecting member 26. When this occurs, the driving pawl 17 becomes disengaged from the pin 3a prior to the driving pawl's reaching the point of reversal. The shutter blade driving members 6 continue to move and the shutter blades continue to open until such time as the pin 3b disposed on the shutter blades actuating member 3 strikes the arresting slide 32 and moves the slide rapidly to the right over the minute distance indicated by the letter "s" in FIG. 1. During this movement, the arresting slide 32 impinges upon the fixed reflector stop 35 whereby the shutter blade driving ring 3 immediately begins to move in the reverse direction. During approximately the same period, the driving lever 27 is released to become operative by the movement of the arresting slide 32. The movement of the driving lever 27 transmitted to the pin 3b causes the return of the shutter blade actuating ring 3 to its initial position. This occurs during the time which the driving pawl 17 continues its reversing movement. The closing of the shutter blades 4 is concluded when the shutter driving members occupy the position illustrated in FIG. 4. In this position, the coupling jaws 17a of the driving pawl 17 re-engage the pin 3a of the shutter blades actuating member 3. The arresting slide 32 then reoccupies its original locking position under the influence of spring 37.

As is clearly shown in the diagram in FIG. 11, the present invention obtains exposure times of the shortest duration with the assistance of the structure herein illustratively described. Referring to FIG. 11, when using the invention to accomplish shutter exposure times, the shutter opens during the time indicated by the ascending curve A–B and closes during the time indicated by the descending curve B–E. It will therefore be understood that the period in which the shutter remains open is virtually of zero value.

In order to reset the shutter into cocked position for a new exposure, the driving disk 6 is moved in a counter-clockwise direction about axis 5. As is clearly indicated in FIG. 4, during this movement the pin 9 will engage and move the overriding pawl 43. This movement is transmitted to the cocking lever 42. The consequent movement of the driving lever exerts a force upon the pin 27f of the driving lever 27 and causes the driving lever 27 to pivot in a counterclockwise direction about its axis 28, whereby the driving lever 27 is moved to the initial position illustrated in FIG. 1. In this position the bent-off lug 27d of the driving member 27 engages the stop 32b of the arresting slide 32, while the driving disk 6 is maintained in cocked position by the engagement of the arresting lever 11 with the projection 6a on the driving disk 6. In order to prevent the disturbance of the maximum cocking moment of the shutter as a result of the action of the spring 29 of the additional driving device of the present invention, the pin 9, which operatively engages the cocking lever 42, is so disposed that the movement of the driving lever 27 into cocked position occurs during the initial movement of the driving disk 6 and the cocking of the driving lever 27 is completely accomplished before the spring 7 reaches the maximum cocked position. As a result, it is only the cocking movement of the spring 7 that must be overcome in the latter part of the cocking process.

In order to accomplish an adjustment of the exposure time as desired in both the cocked and non-cocked positions of the shutter, some leeway is provided between the pawl 41 and the arresting lug 27e of the driving lever 27 when the driving lever engages the stop 32b of the arresting slide 32. As illustrated in FIG. 9, this leeway enables the pawl to be engaged and disengaged dependably and without impediment when adjusting the camera to the different exposure times which are attainable with or without the use of the additional driving device of the present invention. In conjunction with the foregoing arrangement, the supporting edge of the driving member 27 which cooperaes with the arresting slide 32 is also provided with a notch 27g as particularly illustrated in FIGS. 9 and 10. This only permits the arresting slide 32 to have the required freedom of movement when the driving lever 27 is in locked position.

While the invention has been described in detail in connection with one illustrative embodiment thereof, it will be understood that the invention accomplishes the attaining of shorter exposure times in cameras using presently known shutter driving mechanisms in a unique and novel manner and that variations and modifications of the illustrative embodiment of the invention may be made without departing from the spirit of the invention or the scope of the appended claims.

I claim:

1. A photographic intra-lens shutter comprising reciprocating shutter blades, an actuating member therefor, a shutter driving member, a driving pawl connecting said actuating member to said shutter driving member to control the opening and closing of said shutter at relatively slow speeds, means for causing rapid reciprocation of said shutter blades, said means comprising means to disengage said pawl from said actuating member while said actuating member is in motion; and additional rebound means operatively engaging said actuating member to return said shutter blades to their closed position.

2. A photographic intra-lens shutter according to claim 1 in which said rebound means comprises a first member positioned to be moved by said actuating member, a second member engaging said first member and being restrained thereby until said first member is moved by said actuating member, said second member being positioned to engage said actuating member and being resiliently biased to move said actuating member in a direction to return said shutter blades to their closed position.

3. A photographic intra-lens shutter comprising reciprocating shutter blades, an actuating member therefor, a shutter driving member, a driving pawl connecting said actuating member to said shutter driving member, a deflecting member, an exposure-time setting member to move said deflecting member selectively into the path of motion of said driving pawl whereby said driving pawl moves out of engagement with said actuating member at least when said shutter blades swing out to their maximum limit, an additional driving device adapted to be cocked prior to the operation of said shutter and cooperating with said actuating member, said additional driving device being releasable by means of the energy of said shutter driving member and in response to the setting position of said exposure time setting member and upon the deflecting member being in operative position whereby said shutter blades are returned to their closed position.

4. A photographic intra-lens shutter according to claim 3 in which said additional driving device comprises a pivotally mounted driving lever, a driving spring engaging and acting upon said driving lever, a locking member supporting said driving lever in its cocked position, said locking member being movable by said shutter actuating member to release said driving lever for operation after said shutter blades have reached their outermost positions.

5. A photographic intra-lens shutter according to claim 4 in which said locking member is a slide, and comprising, in addition, a fixed stop limiting the path of motion of said slide.

6. A photographic intra-lens shutter according to claim 5 comprising a cocking lever operatively connecting said additional driving member to said driving-pawl drive, and in which said additional driving member can be guided into a cocked position together with said driving-pawl drive.

7. A photographic intra-lens shutter according to claim 6 comprising in addition a pawl associated with said driving member and movable in response to the setting motion of said exposure time setting member, said pawl retaining said driving member in cocked position when said deflecting member is disconnected but being removed from engagement with said driving lever when said deflecting member is in operative position.

References Cited in the file of this patent
UNITED STATES PATENTS
2,949,075    Rentschler _____ Aug. 16, 1960